United States Patent [19]

Saunders et al.

[11] Patent Number: 4,812,365
[45] Date of Patent: Mar. 14, 1989

[54] COMPOSITE-COATED FLAT-ROLLED STEEL CAN STOCK AND CAN PRODUCT

[75] Inventors: William T. Saunders; Warren D. Livingston, Both of Weirton, W. Va.

[73] Assignee: Weirton Steel Corporation, Weirton, W. Va.

[21] Appl. No.: 855,694

[22] Filed: Apr. 25, 1986

[51] Int. Cl.⁴ .................. B32B 9/00; B65D 25/00; B05D 1/36; C23C 22/24

[52] U.S. Cl. .................. 428/469; 220/1 R; 220/62; 220/415; 220/454; 220/461; 148/264; 427/402; 427/407.1; 427/409; 427/410; 204/38.7

[58] Field of Search .......... 427/407.1, 409, 402, 427/386, 388.2, 410; 148/6.14 R, 6.16; 428/469; 220/1 R, 62, 415, 454, 461

[56] References Cited

U.S. PATENT DOCUMENTS

| | | | |
|---|---|---|---|
| 3,666,568 | 5/1972 | Shimanaka et al. | 427/409 X |
| 3,671,331 | 6/1972 | Malkin et al. | 148/6.16 X |
| 4,032,678 | 6/1977 | Perfetti et al. | 427/405 X |
| 4,548,868 | 10/1985 | Yonezawa et al. | 427/409 X |

Primary Examiner—Thurman K. Page
Attorney, Agent, or Firm—Raymond N. Baker

[57] ABSTRACT

Composite-coated flat-rolled steel can stock processing and product for fabrication of drawn one-piece cup-shaped work product or can end walls. Single or double-reduced flat-rolled steel, after cleaning, is chemically treated to apply a chrome oxide coating of about three hundred (300) to five hundred (500) micrograms per square foot to each substrate surface followed by utilization of a dual-organic coating system with application and curing of an organic primer to each chemically-treated surface of the substrate followed by application and curing of an added organic coating on at least one such substrate surface; such composite-coating process resulting in an exterior surface of a drawn can body or end wall having at least about two and one-half (2.5) to about five (5) milligrams of organic coating per square inch and an interior can surface with organic coating weight of at least about seven and one-half (7.5) to ten (10) milligrams per square inch. In cup forming applications, both such surfaces are lubricated with a suitable lubricant approved for food and beverage usage prior to cupping and any redraw operation.

9 Claims, 2 Drawing Sheets

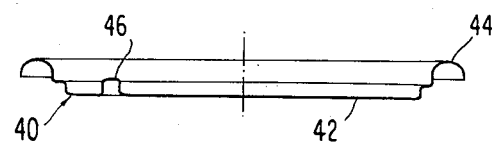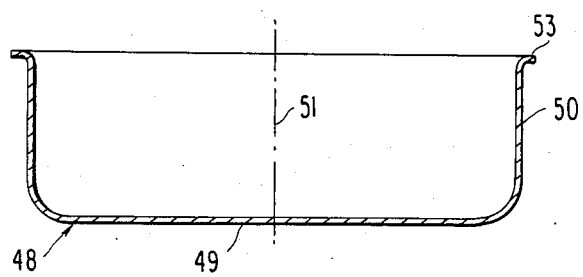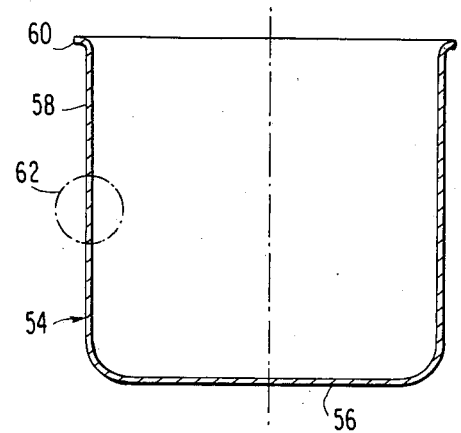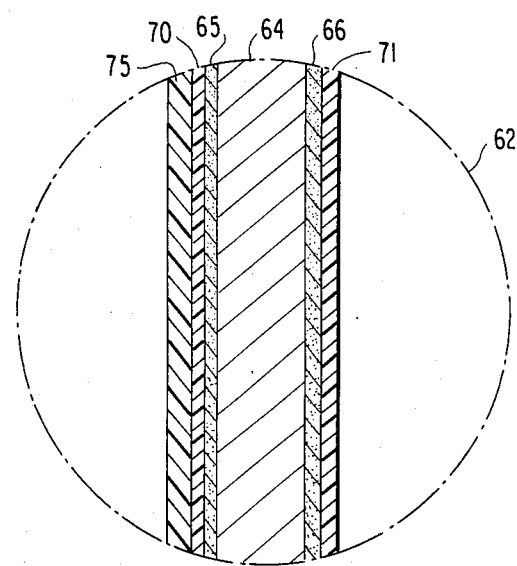

COMPOSITE-COATED FLAT-ROLLED STEEL CAN STOCK AND CAN PRODUCT

This invention relates to flat-rolled steel can stock coating methods, apparatus and products; and, is specifically concerned with composite-coated flat-rolled steel can stock produced for fabrication by drawn processing into one-piece cup-shaped can bodies or for forming can end closures.

Increased tin costs fostered development of substitute metals for electroplating steel, e.g. chromium used in producing so-called tin-free steel (TFS). Also, in the prior art, the TFS surface was considered to be a requirement for proper adhesion of the typical organic coatings used on flat-rolled steel for canning comestibles (U.S. Pat. No. 3,679,513). TFS has thus replaced significant amounts of tinplate. But, plating inefficiency is one drawback of electroplating chromium so that certain steel mills, long accustomed to working with tin electroplating facilities, have chosen not to add TFS facilities.

Contributions of the present invention comprise: a flat-rolled steel can stock capable of being produced at more readily available steel mill facilities worldwide; a can stock which is easier to produce while maintaining organic coating adhesion properties including desired protection, appearance and fabrication properties for forming can end walls, for drawing shallow-depth can bodies and deep-drawn can bodies using improved draw-redraw processing.

Advantages and contributions of the invention are considered in more detail in relation to the accompanying drawings, in which:

BRIEF DESCRIPTION OF THE DRAWING

FIGS. 2, 3 and 4 are cross-sectional schematic views of can parts formed from coated flat-rolled steel processed in accordance with the invention; and FIG. 5 is an enlarged view of a portion of a can part such as the side wall of FIG. 4.

Figure 1:
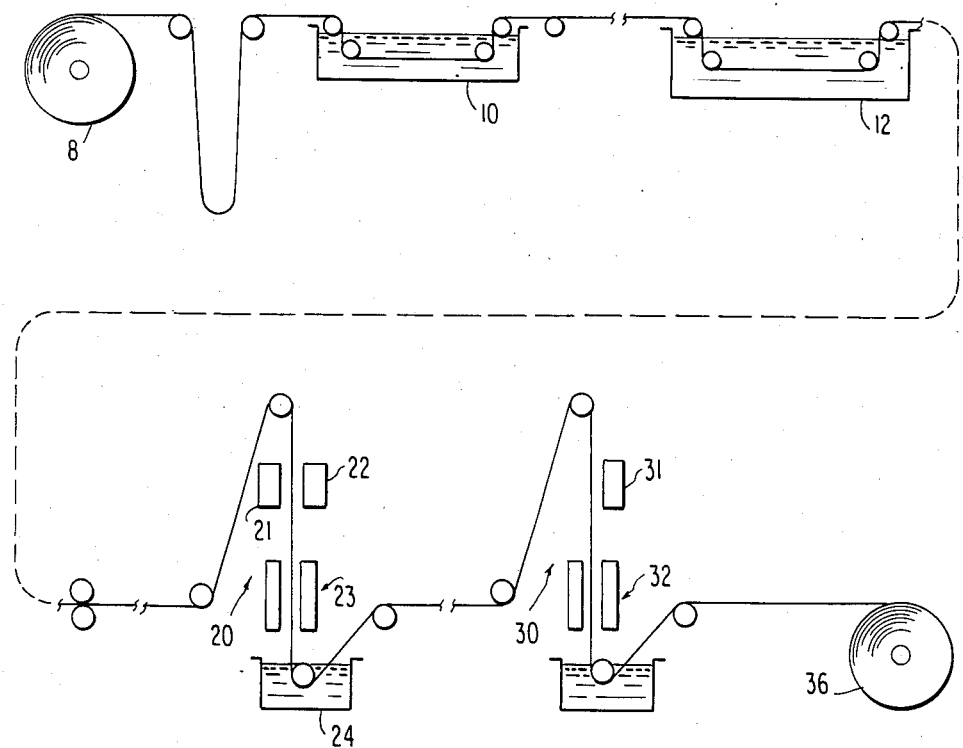
FIG. 1 is a schematic presentation of continuous-strip flat-rolled steel processing in accordance with the present invention.

The invention provides a more readily produced, composite-coated flat-rolled steel can stock which contributes various can manufacturing advantages including desired surface protection properties which also contribute to draw and redraw capabilities. Double-reduced, flat-rolled steel of about thirty-five (35) to about ninety (90) pounds per base box is preferred for draw-redraw practice with the compositecoated can stock of the invention, however, single-reduced is suitable; can end wall stock can extend in thickness up to about one hundred and ten (110) pounds per base box.

By eliminating the need for high electroplating capacities, such as those required for TFS, the invention facilitates more economic continuous-strip processing throughout substrate preparation and enables more efficient combination of steel preparation processing steps and organic coating processing steps.

Referring to FIG. 1, both planar surfaces of the flatrolled steel from coil 8 are prepared for coating in cleansing means 10; known surface cleaning techniques can include a pickling bath treatment. Then, both surfaces are chemically treated to apply a chrome oxide layer to each surface. Sodium dichromate is a satisfactory chemical treatment solution.

A dichromate treatment can be carried out by immersion, with no electric current applied, to deposit about one hundred fifty (150) micrograms of chrome oxide per square foot, plus or minus one hundred (100) $\mu g/ft^2$. Immersion or cathodic dichromate (CDC) chemical treatments, per se, are known for other purposes such as passivation of a tinplate surface. The present invention applied CDC chemical treatment to finish blackplate in preparation for organic coating, about four hundred (400) micrograms per square foot ($\mu g/ft^2$) has been found to be satisfactory for coating adhesion purposes as taught herein. The classification of CDC chemical treatment for use in the present invention can include: CDC-3 which provides $350 \pm 100$ $\mu g/ft^2$ and CDC-5 which provides $550 \pm 100$ $\mu g/ft^2$ of chrome oxide. CDC coating weights up to about five hundred (500) micrograms per square foot of chrome oxide (free of metallic chromium) have been found to be satisfactory for the various intended can product purposes of the invention.

A chemical treatment bath, such as 12, provides for applying a chrome oxide coating to both surfaces of the strip. The cathodic dichromate chemical-treatment chrome oxide layer can be applied in any type of continuous-strip electroplating bath (e.g. as used for electrotinplating) since electrically applied plating action for the CDC chemical treatment of the invention does not require the electroplating capacities of a facility which plates metallic chromium, such as a TFS facility.

This CDC chemical-treatment chrome oxide coating provides an economic way of avoiding metal electroplating problems of the prior art while providing for application and adhesion of organic coatings, providing for draw-forming requirements for both surfaces and providing desired interior and exterior surface protection for a can part formed from such can stock. The capability and facility for organic coating are enhanced by directly combining continuous-strip chemical treatment processing with organic coating processing; also, intermediate handling and application of previously required temporary protection coatings are eliminated.

A dual organic coating system also expands can product fabricating capabilities. In such a system, coating apparatus 20 is used for applying and curing an organic primer; specifically, a relatively lightweight organic base coating. Applicator means 21, 22 apply between about two and a half (2.5) and about five (5) milligrams per square inch ($mg/in^2$) of an epoxy to each surface of the chemically treated substrate; spraying or other known organic coating application means can be used. This organic coating is cured at apparatus 23, e.g. by induction heating, followed by cooling, e.g. by quenching as indicated at 24.

Such organic base coating of both surfaces is followed by addition of a heavier coating of an organic coating material which is compatible with such base coating material, on at least that surface of the substrate which is to be used for the interior of a can product. In a specific embodiment using an epoxy base coating, such additional heavier coating comprises a vinyl organosol or a polyester having a coating weight of about at least five (5) $mg/in^2$ to provide a total organic coating weight of at least about seven and a half (7.5) to ten (10) $mg/in^2$. Ordinarily such total organic coating weight need not exceed fifteen (15) $mg/in^2$ for product protection on the interior surface. Such additional organic coating is not generally required on the exterior of a can product for draw forming or protection purposes; however, it may be utilized e.g. for appearance purposes.

At coating apparatus 30, applicator 31 applies such added coating, to at least one surface, and curing is carried out at apparatus 32 followed by cooling prior to coiling (36); the latter is carried out without application of a temporary mill coating. The prior art separation of TFS plating from organic coating processing required an intermediate temporary surface protector.

When using the composite-coated flat-rolled steel for forming a drawn cup product, a lubricant approved for sanitary can usage, and suitable for draw forming, is applied. Such lubricant, e.g. petrolatum, is applied before each draw operation as disclosed in U.S. patent application Ser. No. 681,630 which is included herein by reference.

The composite-coated can stock of the present invention can be blanked and formed (without such draw lubricant) into can ends as shown in FIG. 2, drawn into shallow cups as shown in FIG. 3, or deep drawn in accordance with the improved draw-redraw practice of assignee's copending U.S. patent application Ser. No. 831,624 which controls side wall gage by decreasing thickness over starting gage throughout all or a major portion of side wall height while limiting thickening, if any, to less than about five percent (5%) near the open end of the flanged can body.

Can end 40 (FIG. 2) includes a substantially planar panel 42 recessed from chime seam flange metal 44. Panel 42 can include additional profiling and/or a rivet button 46 for attachment of an integral tab opener, dependent on intended use of the end closure.

Shallow-depth can body 48 of FIG. 3 includes end wall 49, unitary side wall 50 symmetrically disposed in relation to central axis 51; flange metal 53, at the open end of the can body 48, is oriented transversely to such central axis.

The composite can stock of the present invention can be used to form shallow-depth can bodies of a size from about 211>109 (2 11/16' diameter by 1 9/16" height) to about 401×205, by a single draw with conventional blanking and cupping apparatus without detriment to the coated substrate.

Also, the strip processing and coating as taught above provide suitable adhesion for deep-drawn can bodies by draw-redraw fabrication in which thickening, if any, of the side wall is controlled or minimized, as set forth above.

The redrawn can body 54 of FIG. 4 comprises end wall 56, side wall 58, and flange metal 60 at the open end of the can body. Such redrawn can body can be redrawn into a 307×400 can body (not shown) as taught in the above-identified copending application Ser. No. 831,624.

The composite-coated steel is shown in the enlarged crosssectional view of segment 62 in FIG. 5. Overlaying substrate 64 on each of its surfaces is a chemical treatment chrome oxide coating 65, 66 of about three hundred (300) to about five hundred (500) micrograms per square foot per surface. Overlaying each such chemical treatment layer is an organic base coating 70, 71 of about two and one-half (2.5) to about five (5) milligrams per square inch of each surface. On the surface for the can body interior, an additional organic coating layer 75 has a coating weight of about five (5) to ten (10) milligrams/in² of an organic coating which is compatible with such base coating.

Representative data for carrying out the invention are as follows:
Flat-rolled steel for can body—about 35 to 90 #/BB
for end wall—about 55 to 110 #/BB
Chrome oxide coating—CDC Class 3 to Class 5, both surfaces
Organic coating(s)—about 2.5 to 5 mg/in², both surfaces, then about 7.5 to 10 mg/in² for at least the surface for the can product interior.

A typical double-reduced flat-rolled steel for draw-redraw can bodies fabricated in accordance with the method and apparatus disclosed in copending U.S. patent application Ser. No. 831,624, which is included herein by reference, would be about sixty (60) #/BB having a nominal thickness of 0.0066" (0.158 mm). In a specific embodiment, organic coating materials obtainable from The Valspar Corporation, Pittsburgh, Pa. 15233 comprise a clear epoxy #8406-017 for the organic base coat and a gold vinyl #9764-506 for the organic coating added to at least one surface for use on the interior of a can.

While specific steps and data have been set forth it is understood that, in the light of such disclosure, other values could be selected by those skilled in the art; therefore, for purposes of defining the scope of the present invention, reference will be made to the appended claims.

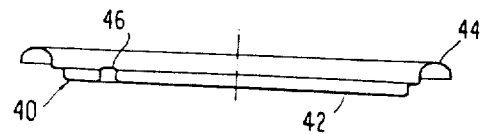
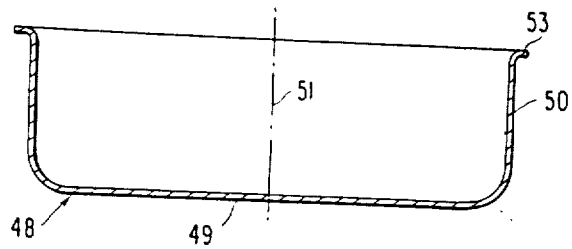
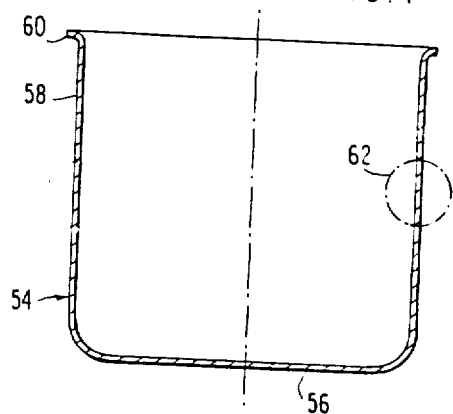
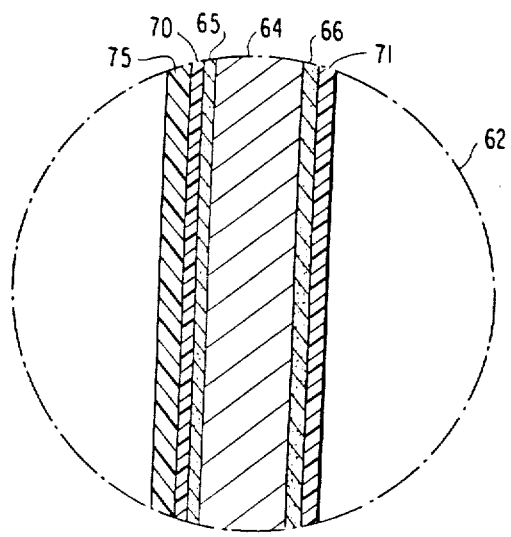

We claim:

1. Process for producing compositecoated flat-rolled steel can stock for can end closures or fabrication of cup-shaped one-piece drawn work product comprising
   providing continuous-strip steel substrate,
   cleaning both surfaces of such substrate,
   chemically treating such substrate to apply a coating consisting essentially of chrome oxide to both surfaces thereof, then
   applying an organic base coating to both such chemically treated surfaces of the substrate,
   such base coating consisting of a preselected organic heat-curable coating material applied with a coating weight between about 2.5 to about 5 milligrams per square inch of each surface.
   curing such organic base coating,
   applying an additional heat-curable organic coating to at least one surface of such base coated substrate to provide a total organic coating weight on such at least one surface of between 7.5 and 15 milligrams/in²,
   such additional organic coating being selected to be compatible with such organic base coating and being applied to such at least one surface of the substrate which is to be used for the interior of a can product formed from such can stock, and
   curing such additional organic coating on such at least one surface.

2. The process of claim 1 in which such chemical treatment step comprises a cathodic dichromate treatment of both surfaces of such substrate.

3. The process of claim 2 in which such cathodic dichromate treatment is carried out to provide a chrome oxide coating weight of about 300 to 500 micrograms per square foot on each surface of such steel substrate.

4. The process of claim 1 or 2 in which such steel substrate comprises
   flat-rolled steel in the range of about 35 to about 110 #/BB.

5. The process of claim 3 in which such organic base coating applied to both surfaces of such chemically treated substrate comprises an epoxy.

6. The process of claim 5 in which such additional organic coating applied to such at least one surface of the organic base coated substrate is selected from the group consisting of vinyl organosols and polyesters.

7. Flat-rolled steel can stock for drawing one-piece cup-shaped can bodies or forming can end wall closures comprising
- a low-carbon flat-rolled steel substrate, such flat-rolled steel having a gage in the range of about 35 #/BB to about 110 #/BB,
- a chemical treatment coating consisting essentially of chrome oxide covering both surfaces of such steel substrate,
- an organic base coating overlaying both such chemical treatment chrome oxide surfaces of the substrate,
- such organic base coating being heat-curable and having a weight of about 2.5 to about 5 milligrams/in$^2$, and
- an added organic coating on at least one surface of such organic base coated substrate,
- such added organic coating being heat-curable and having a weight of at least about 5 milligrams/in$^2$, and selected to be compatible with such organic base coating.

8. The product of claim 7 in which such chemical treatment chrome oxide has a coating weight of about 300 to 500 micrograms per square foot of each such substrate surface.

9. The product of claim 8 in which such organic base coating on both such surfaces comprises an epoxy.

* * * * *

UNITED STATES PATENT AND TRADEMARK OFFICE
CERTIFICATE OF CORRECTION

PATENT NO. : 4,812,365  Page 1 of 2

DATED : Mar. 14, 1989

INVENTOR(S) : William T. Saunders, Warren D. Livingston

It is certified that error appears in the above-identified patent and that said Letters Patent is hereby corrected as shown below:

On sheet 2 of the drawings, FIG. 4 should appear as shown on the attached copy of the formal drawing.

Signed and Sealed this

Tenth Day of November, 1992

Attest:

DOUGLAS B. COMER

Attesting Officer

Acting Commissioner of Patents and Trademarks